United States Patent
Sanz-Pastor et al.

(10) Patent No.: US 6,747,649 B1
(45) Date of Patent: Jun. 8, 2004

(54) TERRAIN RENDERING IN A THREE-DIMENSIONAL ENVIRONMENT

(75) Inventors: Ignacio Sanz-Pastor, San Francisco, CA (US); David L. Morgan, III, Redwood City, CA (US)

(73) Assignee: Aechelon Technology, Inc., San Carlos, CA (US)

( * ) Notice: Subject to any disclaimer, the term of this patent is extended or adjusted under 35 U.S.C. 154(b) by 2 days.

(21) Appl. No.: 10/102,234

(22) Filed: Mar. 19, 2002

(51) Int. Cl.[7] .............................................. G06T 15/00
(52) U.S. Cl. ...................................... 345/428; 345/587
(58) Field of Search ................................ 345/419, 420, 345/423, 427, 428, 581, 587, 473, 474, 425, 952, 959, 960

(56) References Cited

U.S. PATENT DOCUMENTS 5,367,615 A * 11/1994 Economy et al. ........... 345/441

OTHER PUBLICATIONS

Ackerman, R.; Graphics Generation Takes a Giant Leap Out of Laboratory, *Signal Magazine*, 1996, retrieved from internet at http://www.us.net/signal/archive/February96/graphicfeb.
Cosman, M.; Mission Rehearsal Modeling, Image IV Conference (1992).
Premoze, S. et al.; Geospecific Rendering of Alpine Terrain, Dept. of Computer Science, University of Utah, Publication date: unknown.
Stevens, D.; Terrain Database Generation—An Introduction, retrieved from internet at http://www.sistostds.org/weblet-ter/siso/lss_74/art_328.htm.
Polynomial Texture Mapping (PTM) Research, retrieved from internet http://www.hpl.hp.com/ptm/. Publication date: Unknown.

* cited by examiner

*Primary Examiner*—Almis R. Jankus
(74) *Attorney, Agent, or Firm*—Fenwick & West LLP

(57) ABSTRACT

Terrain is rendered in a three-dimensional computing environment by attaching a number of fixed terrain layers to the viewer, in a configuration such that each layer resembles a "magic carpet" on which the viewer flies. Each concentric layer covers a successively larger area of the visual database, and the vertex density and texture resolution of each layer is independent of other layers. Each layer may feature a fading band around its circumference, which can facilitate fading between consecutive layers. This approach achieves optimal vertex density/range distribution, which enables both very far horizons (exceeding 100 nmi) and very high elevation detail in the foreground, while maintaining strict performance requirements. High texture resolution and sparsely populated terrain texture are also achieved without the use of specialized hardware because each layer is textured independently. This overcomes the need for special-purpose hardware and provides a superior visual experience compared to previously available techniques.

13 Claims, 13 Drawing Sheets

| N | NE | NW |
|---|---|---|
| 1 3 2 / 4 6 5 / 7 9 8 | 3 2 1 / 6 5 4 / 9 8 7 | 1 2 3 / 4 5 6 / 7 8 9 |
| FIG. 7a | FIG. 7b | FIG. 7c |

| E | EN | ES |
|---|---|---|
| 7 4 1 / 9 6 3 / 8 5 2 | 7 4 1 / 8 5 2 / 9 6 3 | 9 6 3 / 8 5 2 / 7 4 1 |
| FIG. 7d | FIG. 7e | FIG. 7f |

TERRAIN RENDERING IN A THREE-DIMENSIONAL ENVIRONMENT

BACKGROUND OF THE INVENTION

1. Field of the Invention

The present invention relates generally to improved terrain mapping in interactive 3D computer graphics applications.

2. Description of the Related Art

Flight simulation is the quintessential example of interactive 3D computer graphics applications. The purpose of any flight simulator Image Generator (IG) is to provide one or more pilots with a virtual representation of the real world (especially outside the cockpit) to the maximum degree of fidelity possible with available technology. The more realistic the rendering is, the more effective the training. Since the earliest days of 3D flight simulators, there has been some representation of the terrain (i.e. the ground, lakes, rivers, ocean, etc.). At first, this was just a simple horizon dividing a blue sky from green earth, providing not even the illusion of traveling over the earth. Later came systems using "geotypical" terrain, in which swatches of real-looking terrain were stitched together to provide the illusion of flying over an actual place (e.g. landscapes similar to what one might see in the vicinity of Darmstadt, Germany). These systems generally use actual elevation data from the region being simulated, but generic texture maps. For example, the locations of farmland, desert, and cities might be consistent with reality, while the images used to represent these types of terrain do not correspond to the actual farms and cities over which flight is being simulated.

The current state of the art is known as geospecific terrain, in which both the elevation data and the texture maps that are combined to form the terrain are derived from the real world. The elevation data is typically obtained using radar from satellites (e.g., DTED-1, DTED-2), or other conventional imaging systems. The texture data is also typically obtained from satellite imagery, although aerial photography is commonly used as well. The quality of both elevation and texture data is measured in terms of its resolution. For elevation, this means the distance between "postings," meaning the locations where the height of the earth is sampled. For example, DTED-1 elevation data provides elevation at roughly 90-meter postings. Imagery resolution is measured similarly. For example, in 16-meter imagery, a single texel (texture element) corresponds to a 16 m×16 m square of the ground. Imagery is available in much higher resolutions, such as 20 cm and beyond.

Additionally, flight simulation is no longer limited to the visual spectrum. For military flight simulators, it is important to also simulate sensors, such as FLIR (Forward Looking Infra Red), NVG (Night Vision Goggles), low light level television, and Radar. In a geospecific simulator, multispectral or hyperspectral (i.e. some or many wavelengths) imagery may be used in conjunction with an accurate model of the sensor's spectral response characteristics to create a physics-based simulation of how a particular sensor will behave during a simulated mission.

For any flight simulator, whether geospecific or geotypical, the distance to the horizon is an important factor in realism. Some simulators have very short horizons, e.g., 5 nautical miles (nmi), which causes the experience to be like constantly flying through dense fog, regardless of the simulated weather conditions. For jet simulators, a horizon of 50 nmi is generally acceptable, and for helicopters, 30 nmi is generally acceptable for effective training using commercially available flight simulators consistent with the current state of the art. In the real world, however, horizons can be much farther, reaching as far as 100 nmi for turbine aircraft. Keeping a large horizon range while showing realistic close range detail at real time interactive update rates is one significant challenge faced by designers of terrain rendering algorithms.

Transforming raw source data into a visual simulation that a user can experience typically involves two main steps: Database Creation and Interactive Rendering. The scene database is a collection of all the data fed into the IG to produce a realistic simulation of a particular place, and particular tactical data (such as specific enemy planes, tanks, etc.), in a format that the image generator can understand and efficiently render. While there are several common, or "open" database formats, it is often necessary to translate these databases into proprietary formats that are optimized for the technical characteristics of a specific IG. Terrain is the largest element of a large geospecific database. The texture and elevation data can range in size from a few gigabytes to over a terabyte for a single scene database. Since the early days of image generation, the position of the pilot's viewpoint (also known as the "ownship") has been used to control reading, or "paging" of data from an input/output device such as a disk storage system or network. This is especially important for large scene databases because it is impractical or impossible to store the entire scene database in high-speed memory such as RAM.

For geospecific terrains, the Database Creation process includes orthorectification of elevation and imagery, creating 3D geometry from elevation data, assembling individual images into larger texture maps, and converting these texture maps into a format usable by the IG. Generally, the amount of data decreases during this process, as elevation is sub-sampled to match the geometry performance of the IG and the imagery's precision (the number of bits used to represent each texel) is reduced to match bandwidth constraints of the IG. Multiple Levels of Detail (LOD) of the elevation geometry are generally created, and texture MIP levels are also created.

The Interactive Rendering process is where the IG must render the "area of regard" of the pilot (i.e. the pilot's current surrounding environs) at a rate equal to the display's refresh rate, typically 60 Hz. It is important that the IG constantly meet this refresh rate target, or the scene will appear to stutter or jitter, which is unacceptable for effectively training pilots. The 3D scene can comprise many elements, including sky, sun, clouds, terrain (including ocean), air targets (i.e., other aircraft), ground targets (e.g., tanks, trucks), special effects (e.g., explosions, smoke columns), and cultural features (e.g., buildings, trees). Some of these elements (targets, terrain, cultural features) are contained in the scene database. Other elements (such as special effects, sea) are generated procedurally within the Image Generator.

The method used for rendering the terrain depends on how the data is organized in the scene database. Most geospecific flight simulators organize the terrain geometry into "cells." In Aechelon Technology's C-Nova Image Generator, for example, which is a runtime engine for flight training applications that transforms commercially available platforms into high-resolution, multi-spectral, multi-channel, geo-specific image generators, the terrain is subdivided into 5 km square cells. For a 1000 km×1000 km database, there are 40,000 cells. The structure is similar to a quilt, where each cell is a "square." The pilot flies over the quilt. Generally, each cell can be rendered at multiple LODs, with the finest levels of detail drawn nearest the viewer ("ownship") and the coarsest LODs drawn at the horizon. One purpose for using a LOD mechanism is to maximize the finite geometry capability of the graphics subsystem. It is not necessary to render fine LODs far from the viewer because the fine and coarse LODs are essentially indistinguishable at that range: Beyond a certain range, the cells are not drawn at all. Modern IGs perform "view frustum culling," in which objects (including terrain cells) that fall entirely outside the viewport (display) are excluded from rendering at the per-object or greater level. In some systems, terrain cells are merged into larger cells in the coarser LODs. This technique can be desirable because it allows a greater variance in the number of polygons per square kilometer along the LOD continuum.

Some IGs have support for fading between LODs, in which a cell in transition between two levels of detail undergoes a blending operation to cause the new LOD to fade in and the old LOD to fade out. This is a desirable form of LOD transitions, because instant transitions and geometry morphing schemes are easily noticed, and cause distractions objectionable to pilots, but it involves a negative impact on performance, since both the coarse and detailed objects are drawn and blended during the transition. It is important to preserve the "suspension of disbelief" during the entirety of a simulation. LOD fading is a difficult feature to attain without specialized hardware because of ordering considerations when using alpha blending. Those skilled in the art are aware that the most widely available realtime transparency algorithms are order-dependent, where partially transparent objects must be drawn after the objects they occlude. Hardware such as the SGI InfiniteReality graphics engine provides a multisample alpha (MSAlpha) mechanism for order-independent transparency. While this eliminates the need for computationally expensive sorting, it is a costly "high-end" graphics system, and therefore not an adequate solution for most end users.

Non-cellular terrains also exist in the prior art. Most of the non-cellular approaches use a technique called "dynamic terrain," in which the Image Generator regenerates a polygon mesh for each particular viewpoint or set of similar viewpoints, with either a continuous triangulation topology such as Delaunay triangulation (used in the Silicon Graphics Advanced Surface Definition (ASD) terrain implementation) or a dynamic meshing scheme such as the Evans and Sutherland "morphing terrain" described by Michael Cosman in his 1992 Image Conference paper, where the terrain elevation data is meshed in real time with an irregular hierarchical polygon grid.

For large-area geospecific databases, which use large quantities of satellite imagery and/or aerial photography, the size of the terrain texture vastly exceeds the amount of texture memory available in the graphics subsystem. For this reason, a "paging" system is commonly employed. The paging system uses a pool of texture memory for the area of regard, and updates the edges of the texture memory as the pilot flies across the scene database. OpenGL provides a mechanism called glTexSubImage to allow an application to update a subset of a texture map in memory. An alternative to a texture paging scheme such as this is to divide the texture into cells aligned with the terrain cells, and apply each individual texture map to its corresponding terrain cell. However, this method requires a surprisingly large amount of texture memory and state-change overhead and is not in wide use.

Specialized hardware can also assist with the challenge of applying the texture map to the terrain geometry. For example, SGI's InfiniteReality graphics engine provides a specialized mechanism called "Clip-Map," which, enabled through SGI's IRISPerformer API, provides a "virtual MIP-map" that handles texture paging transparent to the application and allows the texture map organization to be totally decoupled from the terrain geometry structure. Clip-mapping also transparently allows a terrain texture to be sparsely populated, meaning the overall terrain texture map can have varying resolutions at different areas. Other products such as Evans and Sutherland's ESIG 4000 also provide support for sparse population of terrain texture. In a traditional MIP-map, a base texture of some size (e.g., 1024× 1024 texels) is decimated into "MIP levels," each ½ the size of the finer level (e.g., 512×512, 256×256, . . . ,1×1). The purpose of pre-filtering the texture map into levels is to allow for efficient rendering of textured objects at any range or orientation with consistent quality. Without the ability to sparsely populate a terrain texture, the amount of disk space required to store the texture would be much larger than necessary. For example, suppose a 1000 km×1000 km database with a base resolution of 16 m per texel, with a single airfield where 1 m per texel imagery is required over a 10 km×10 km area. With sparsely populated texture, the database might require 1 GB for the entire texture. With a conventional MIP-map, the size of the texture map would be 1.3 TB. This is because the 16 m level would need to be supersampled up to 1 m over the entire database. Because of this effect, storing the terrain texture in the database in a sparsely-populated form is very desirable.

Accordingly, no terrain schemes are known that are simultaneously geospecific, capable of covering large areas, and feature LOD fading without the use of costly, special-purpose hardware. Additionally, no terrain schemes are known that are capable of rendering both high detail in the foreground and physically realistic horizons at high altitudes while meeting the requirements of geospecificity and LOD fading. Therefore, the problem of interactively rendering terrain has not yet been adequately solved. A terrain rendering method is needed that is as or more realistic than that which is currently available in the art, and which can be implemented on commodity hardware not possessing special-purpose high-end features.

SUMMARY OF THE INVENTION

In accordance with the present invention, there is provided a system and method for interactive rendering of geospecific terrain. The present invention requires no special-purpose hardware and enables a highly realistic experience by providing high foreground detail, far horizons and minimized LOD transition artifacts through LOD fading. The resulting visual experience exceeds the realism of previous methods without compromising strict interactive performance requirements.

The present invention solves the terrain rendering problem by constructing a number of fixed terrain layers centered about the viewer, in a configuration such that each layer resembles a "magic carpet" on which the viewer (ownship) flies. Each concentric layer covers a successively larger area of the visual database, and the vertex density and texture resolution of each layer is independent of other layers. Furthermore, each layer may feature a fading band around its circumference that facilitates fading between consecutive LODs (layers). This approach achieves optimal vertex density/range distribution, which enables both very far horizons (exceeding 100 nmi) and very high elevation detail in the foreground, while maintaining strict performance requirements. High texture resolution (less than 0.5 m) and sparsely populated terrain texture are also achieved without the use of specialized hardware because each layer is textured independently. Thus, the present invention overcomes the need for special-purpose hardware and provides a superior visual experience compared to previously available techniques.

One goal of most geospecific terrain rendering systems is to provide the pilot with the most realistic experience possible without compromising the strict update rate requirement—typically 60 Hz. Within this constraint, realism is enhanced by maximizing the resolution of terrain geometry and texture near the viewer. The use of both multiple geometrical LODs and texture MIP levels is desirable to meet quality and performance criteria. It is important, therefore, to provide a mechanism for fading between geometry LODs and for rendering a sparsely populated terrain texture.

In the present invention, the terrain is organized into a finite number of layers, which are centered about the viewer, wherein the first layer is of a specific size (e.g., 5 km) and each subsequent layer is some multiple, e.g., twice, two-and-a-half, etc., as large as its predecessor. The vertex density of each layer is independent of the other layers, typically with the highest vertex density in the smallest layer and the progressively lower vertex densities in the larger layers. Each layer preferably includes a fade band around its circumference, which facilitates the fading between consecutive layers.

Each layer may be subdivided into sectors to facilitate culling. In one embodiment, nine sectors are used to allow a simple configuration having a center sector that corresponds to where layers overlap. For layers covered by smaller layers, the center sector may not be rendered, resulting in reduced scene complexity. The layers are drawn in order from the largest to the smallest to facilitate the LOD fading. In order to prevent the layers from interpenetrating, the layers are drawn without depth testing. Consequently, the individual primitives comprising the layers are preferably sorted from back-to-front in a manner similar to the Painter's Algorithm, which is conventionally known.

Each layer is rendered with one or more texture maps bound to the layer, which is populated with data from the overall terrain texture using a conventional texture paging mechanism. The sizes of the texture maps are independent, although for a given layer size, the texture is preferably sized such that the valid area of the texture (each texture has a paging band around its edges into which texture paging subloads occur) maps to the layer size with a ratio available in the overall terrain texture. For example, if the terrain texture contains levels that are multiples of 1.1 meters per texel, a texture with a valid area of size 960 texels will map to a layer whose size is a multiple of 1056 meters.

In the scene database, the terrain elevation is also organized into layers, with one terrain elevation layer per rendering layer. Each terrain layer in the database is subdivided into equally sized tiles, each the size of the rendering layer. A tile is preferably comprised of N×N vertices, organized topologically into rows and columns, as well as metadata such as the minimum and maximum height of the tile, the terrain type for the tile, etc. The texture map in the database is also arranged into tiles, which are of uniform, but arbitrary size. However, texture levels that are smaller than the tile size may be stored in their correct size. Texture data is stored in a Sparse Image Pyramid, wherein the finest resolution for a given area is arbitrary (constrained to tile and level boundaries). For any given finest resolution, a complete set of decimated levels of the texture are present in the pyramid.

Sea is also supported using this terrain rendering approach, through a set of sea rendering layers corresponding to some or all of the terrain rendering layers. The sea rendering layers are subdivided into sectors in a manner similar to the terrain rendering layers. A tile type field contained in the terrain layers in the database is preferably sampled per-sector to activate or deactivate the sectors of each layer in the terrain rendering layers and the sea rendering layers. A per-texel transparency component stored in the terrain texture pyramid allows fine definition of coastlines.

BRIEF DESCRIPTION OF THE DRAWINGS

FIGS. 7a–7f illustrate the order in which sectors of rendering layers are drawn for six of the possible cases in accordance with an embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The present invention provides interactive rendering of geospecific terrain, requiring no special-purpose hardware and enabling a highly realistic experience by providing high foreground detail, far horizons and minimized level of detail transition artifacts through LOD fading. The resulting visual experience exceeds the realism of previous methods without compromising strict interactive performance requirements.

The present invention renders 3D terrain by attaching a number of fixed terrain layers to the viewer, in a configuration such that each layer resembles a "magic carpet," on which the viewer flies. The specific number of layers depends on the requirements of horizon range, foreground detail, and texture resolution, constrained by the ever-present realtime performance requirement (e.g., 60 Hz). Each concentric layer preferably covers a successively larger area of the visual database, and the vertex density and texture resolution of each layer is independent of other layers. Furthermore, each layer preferably features a fading band around its circumference, which facilitates fading between consecutive LODs, i.e., layers. This approach achieves optimal vertex density/range distribution (wherein triangles at every range project to roughly the same size on the screen), which enables both very far horizons (typically exceeding 100 nautical miles) and very high elevation detail in the foreground, while maintaining the strict performance requirements for sustained frame rate operation. High texture resolution (less than 0.5 m) and sparsely populated terrain texture are also achieved without the use of specialized hardware because each layer is textured independently using simple MIP-mapping available on most commodity graphics hardware. Thus, the present invention overcomes the need for special-purpose hardware and provides a superior visual experience compared to previously available techniques.

System Architecture

Figure 1:
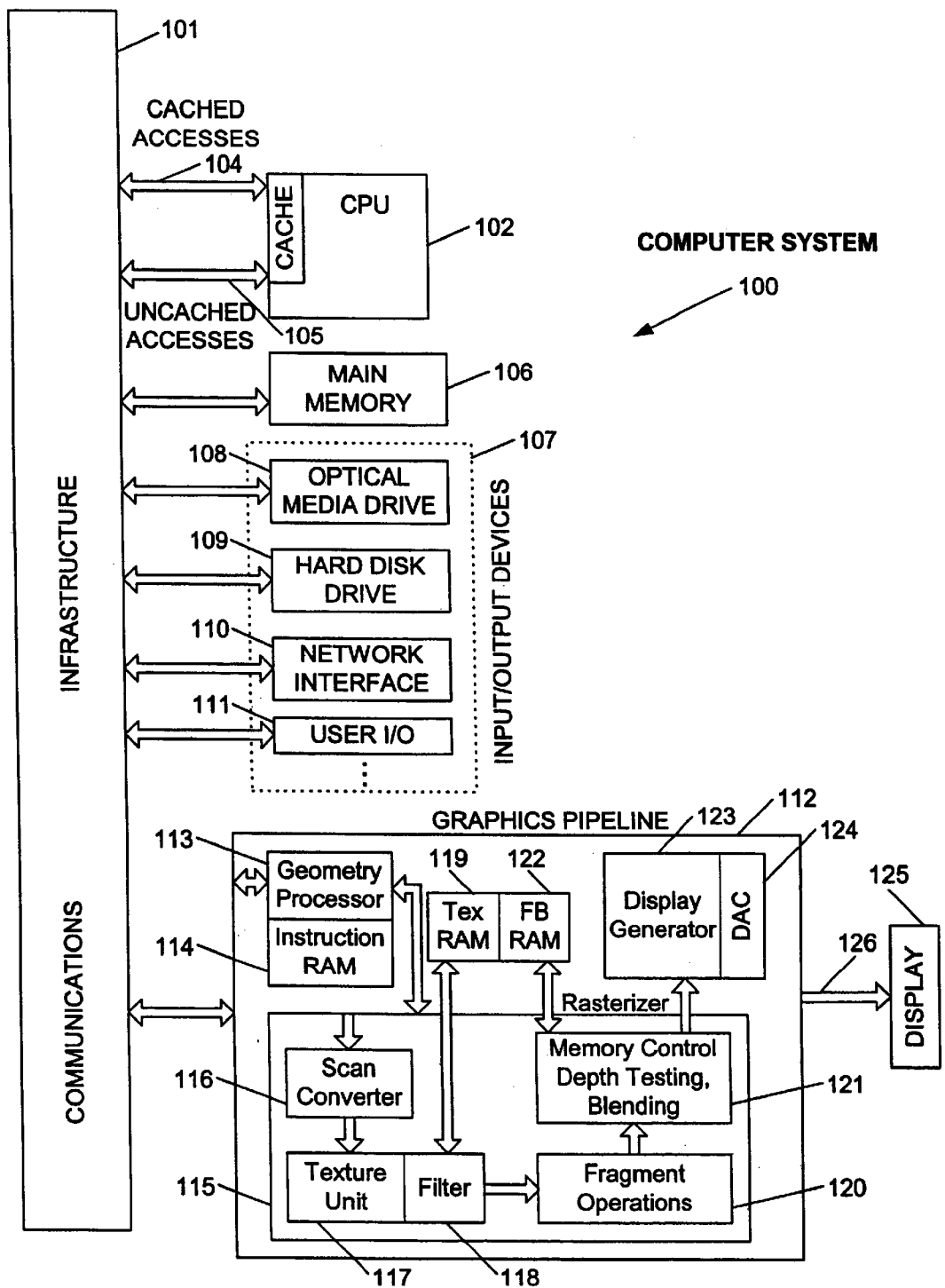
FIG. 1 illustrates a system equipped with a three-dimensional graphics pipeline suitable for use with the present invention.

FIG. 1 depicts an example of a computer system 100 equipped with a three-dimensional graphics pipeline 112 suitable for use with the present invention. The graphics pipeline is one embodiment of a three-dimensional renderer or a real-time three-dimensional renderer. Computer system 100 may be used to render all or part of a scene mapped in accordance with the present invention. This example computer system is illustrative of the context of the present invention and is not intended to limit the present invention. Computer system 100 is representative of both single and multi-processor computers.

Computer system 100 includes one or more central processing units (CPU), such as CPU 102, and one or more graphics subsystems, such as graphics pipeline 112. One or more CPUs 102 and one or more graphics pipelines 112 can execute software and/or hardware instructions to implement the graphics functionality described herein. Graphics pipeline 112 can be implemented, for example, on a single chip, as part of CPU 102, or on one or more separate chips. Each CPU 102 is connected to a communications infrastructure 101, e.g., a communications bus, crossbar, network, etc. Those of skill in the art will appreciate after reading the instant description that the present invention can be implemented on a variety of computer systems and architectures other than those described herein.

Computer system 100 also includes a main memory 106, such as random access memory (RAM), and can also include input/output (I/O) devices 107. I/O devices 107 may include, for example, an optical media (such as DVD) drive 108, a hard disk drive 109, a network interface 110, and a user I/O interface 111. As will be appreciated, optical media drive 108 and hard disk drive 109 include computer usable storage media having stored therein computer software and/or data. Software and data may also be transferred over a network to computer system 100 via network interface 110.

In one embodiment, graphics pipeline 112 includes frame buffer 122, which stores images to be displayed on display 125. Graphics pipeline 112 also includes a geometry processor 113 with its associated instruction memory 114. In one embodiment, instruction memory 114 is RAM. The graphics pipeline 112 also includes rasterizer 115, which is communicatively coupled to geometry processor 113, frame buffer 122, texture memory 119 and display generator 123. Rasterizer 115 includes a scan converter 116, a texture unit 117, which includes texture filter 118, fragment operations unit 120, and a memory control unit (which also performs depth testing and blending) 121. Graphics pipeline 112 also includes display generator 123 and digital to analog converter (DAC) 124, which produces analog video output 126 for display 125. Digital displays, such as flat panel screens can use digital output, bypassing DAC 124. Again, this example graphics pipeline is illustrative of the context of the present invention and not intended to limit the present invention.

Figure 2:
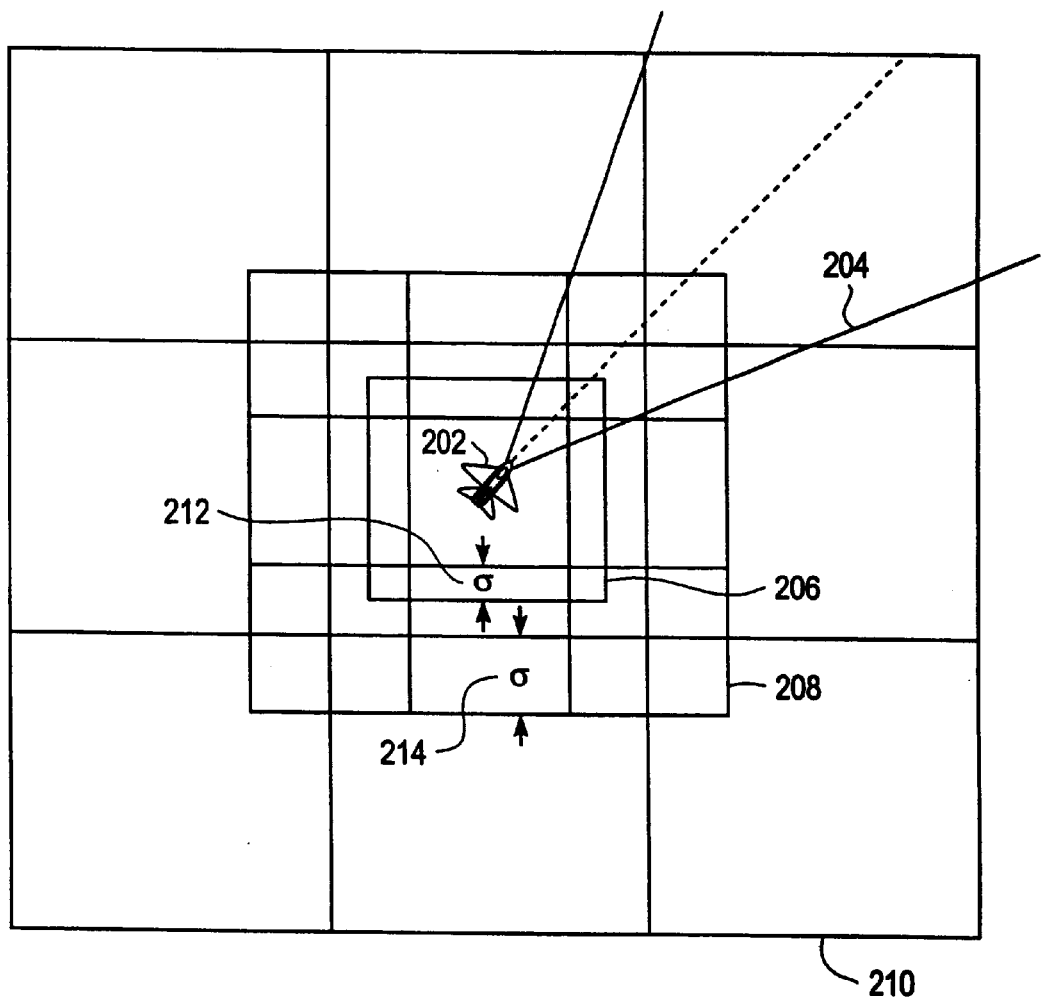
FIG. 2 shows the ownship (viewer) with its view frustum, over three terrain layers with overlap sigma in accordance with an embodiment of the present invention.

FIG. 2 shows an ownship 202 and a view frustum 204 for one channel (a coupled display/graphics system) of an Image Generator in accordance with an embodiment of the present invention.. FIG. 2 also depicts three terrain rendering layers 206, 208, and 210, which follow the ownship as it flies within a database. Layer 206 is not subdivided into sectors because it is not overlapped by any smaller layers. Layers 208 and 210 are each subdivided into nine sectors, with the center sector removed. Layer 208 is twice as wide as Layer 206, and Layer 210 is twice as wide as Layer 208. In the illustrated example, each sector within a layer is ⅓ of the entire layer's width. Because of this geometry, a given layer overlaps the next larger layer by an amount "sigma" 212, 214, which is ⅙ of the smaller layer's width. An actual set of terrain rendering layers may have more or fewer layers, but similar geometrical relationships preferably apply to all layers. Generally, a region sigma is determined by how the layers overlap, taking into account the fact that the layers may follow the viewer at different intervals, shrinking the effective overlap region.

In certain terrain configurations in which the layers track the viewer at different intervals, resulting in a shrinking of the usable overlap region sigma, it is preferable to render a "ring" around the perimeter of the center sector of some layers to guarantee that the layers will properly overlap without the viewer seeing holes in the terrain. This is caused by differences in the vertex densities of adjacent layers, which causes the layers to follow the ownship at different intervals. The ring (which is one strip thick in a preferred embodiment) provides a "cushion" to prevent holes from appearing when the layers are slightly out of sync.

Figure 3A:
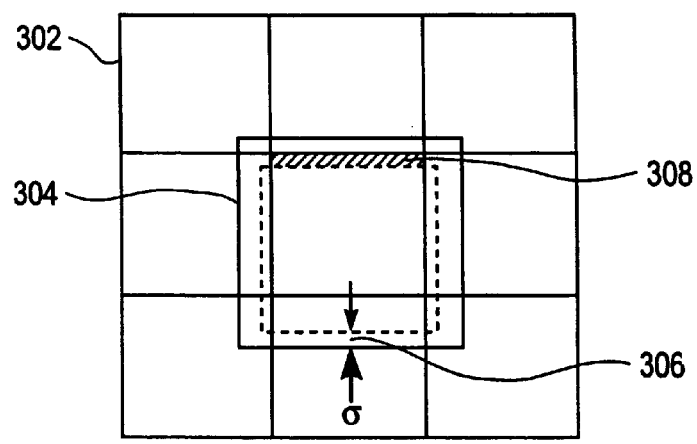
FIGS. 3a–3c illustrate the problem of out-of-sync layers and two approaches for covering the resulting hole in accordance with an embodiment of the present invention.
Figure 3B:
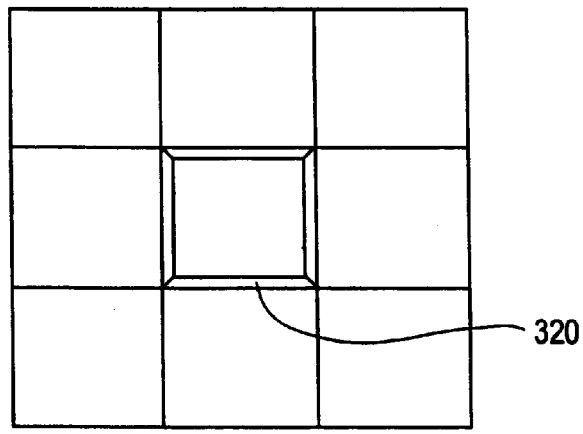
Figure 3C:
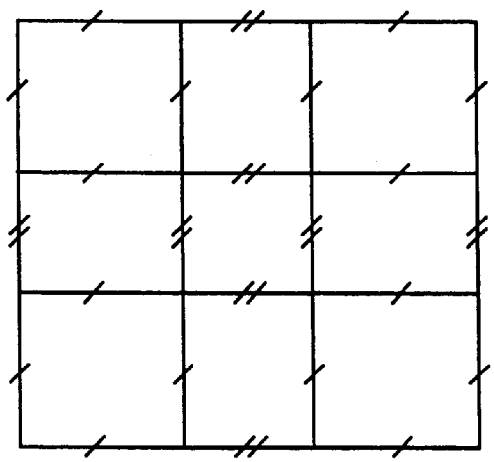

Referring now to FIG. 3, there is shown an example of this problem and its solution. FIG. 3a includes a larger layer 302, and a smaller layer 304. Larger layer 302 is divided into nine sectors for purposes of example, as described above, and the center sector is not rendered. Smaller layer 304 includes a fade region 306, also as described above. Generally, the fade region 306 of smaller layer 304 fades into larger layer 302. However, as can be seen in FIG. 3a, it is possible for the fade region of smaller layer 306 to fade into a part of the center sector of larger layer 302, which is not rendered. This is represented by region 308 in FIG. 3a. System 100 overcomes this difficulty by adding a ring to the center sector of larger layer 302. Referring now to FIG. 3b, there is shown ring 320, as just described. Since ring 320 can be drawn at the fill rate, it is a relatively fast operation, and overcomes the problem of the smaller layer fading into an unrendered region. Alternatively, the eight rendered sectors of layer 302 can be configured as illustrated in FIG. 3c to cover the same area as in FIG. 3b. This results in square sectors in the corners and center of the layer, and oblong sectors otherwise. The ring method depicted in FIG. 3b is typically preferred because each sector is of equal size.

Each sector of a layer is preferably rendered as a set of triangle strips as depicted in FIGS. 4b–f. Triangle strips are well known to those of skill in the art. For example, if the overall width of layer 206 is 3000 meters (m), and the average post spacing is 100 m, then layer 206 would be comprised of 30 strips, constructed from 31*31=961 vertices. Continuing the example, the overall size of layer 208 would be 6000 m; suppose the average post spacing for layer 208 is 200 m. Then each sector of layer 208 would be comprised of 10 strips, constructed from 11×11=121 vertices. The minimum requirement for each vertex is a scalar elevation value. In a preferred embodiment, each vertex is comprised of x, y, and z coordinates. Vertices may also include explicit texture coordinates, color values, and/or normal vectors.

In order to prevent coarser layers from interpenetrating finer layers—which would cause objectionable visual artifacts—the layers are preferably drawn in order from largest (farthest) to smallest (nearest), with depth-testing disabled but depth writes enabled. This causes the depth values in the frame buffer to always represent the depth (Z) of the smaller layer where two layers overlap. The resulting image in the frame buffer 122 will be free of undesired interpenetration and will have accurate depth values for proper occlusion with other objects in the scene. Each terrain layer is also preferably sorted for back-to-front rendering to ensure that the correct polygons are visible. For example, with depth testing disabled, if a distant mountain is drawn after a near mountain that should occlude the distant peak, the distant mountain will be visible in error. Backface culling is also enabled in a preferred embodiment, which prevents the incorrect case of the back side of a mountain showing through the front side.

Figure 4A:
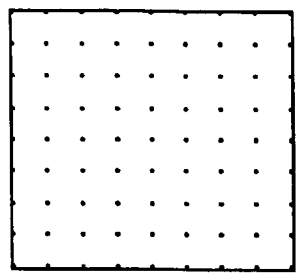
FIGS. 4a–4f show the meshing algorithm of vertices in various compass octants in accordance with an embodiment of the present invention.
Figure 4B:
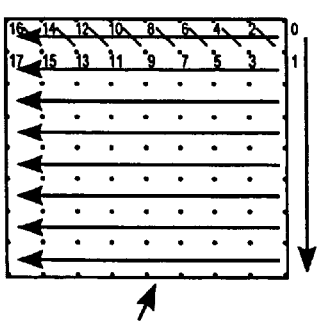
Figure 4C:
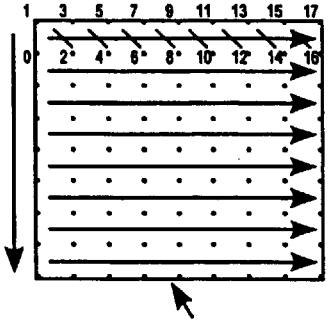
Figure 4D:
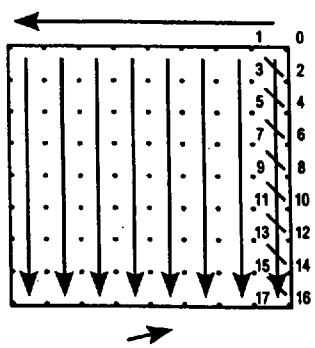
Figure 4E:
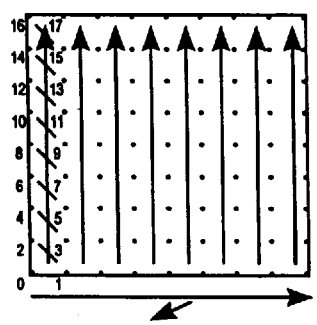
Figure 4F:
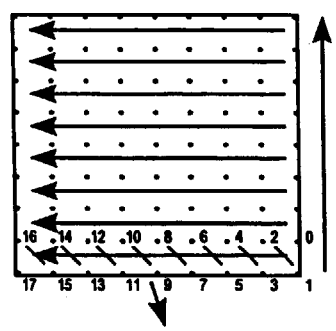
Figure 5:
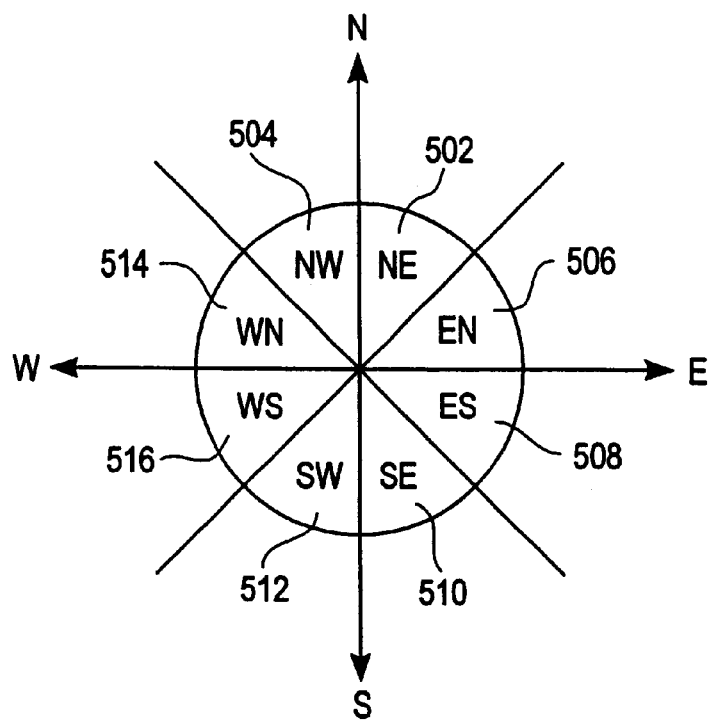
FIG. 5 shows the division of the compass into octants for sorting in accordance with an embodiment of the present invention.

FIG. 5 shows eight distinct cases that the view direction can take in a preferred embodiment, each resulting in different sorting. The eight cases are: Northeast 502, Northwest 504, Eastnorth 506, Eastsouth 508, Southeast 510, Southwest 512, Westnorth 514, and Westsouth 516. It should be noted that simply using the ownship's 202 heading to compute the view direction is inadequate. Pitch and Roll must be taken into account as well. FIGS. 4b–f illustrate how a sector of vertices (FIG. 4a) is stripped (meshed) for 5 of the 8 sorting cases. FIG. 4b illustrates Northeast 502, FIG. 4c Northwest 504, FIG. 4d to Eastnorth 506, FIG. 4e to Westsouth 516, and FIG. 4f to Southeast 510.

Figure 6:
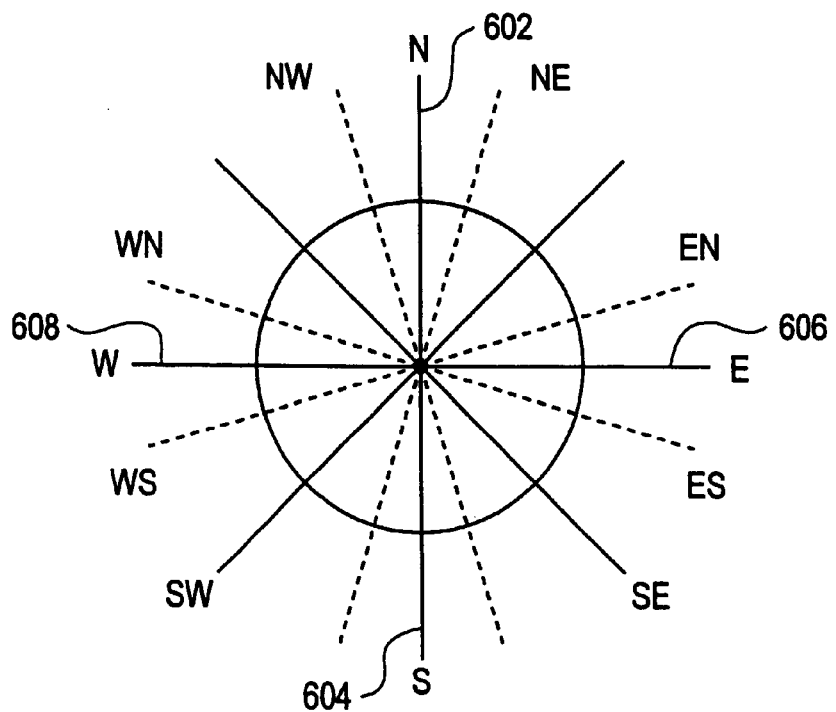
FIG. 6 shows a version of FIG. 5 with 4 "on-axis" directions added, in accordance with an embodiment of the present invention.

For rendering layers subdivided into multiple sectors, the sectors are also rendered in order from far to near. FIGS. 6 and 7a–f illustrate a sorting methodology for sectors. FIG. 6 shows a version of FIG. 5 with four "on-axis" directions 602, 604, 606 and 608 added, representing North, South, East and West, respectively. In addition to dividing the compass into octants, the view direction is said to be on-axis if it is sufficiently close to looking directly North, South, East or West. FIG. 7a illustrates the sorting order if the view direction is Northeast or Northwest but is on-axis. Note that the sectors are drawn from far to near, and are also drawn from outside inward. This ordering is because of the nature of perspective projection (as opposed to orthographic projection). FIGS. 7b and 7c illustrate the sector draw orders if the viewer is looking Northeast or Northwest but is not on-axis. FIGS. 7d, 7e, and 7f apply similarly to the East-facing directions.

Figure 8:
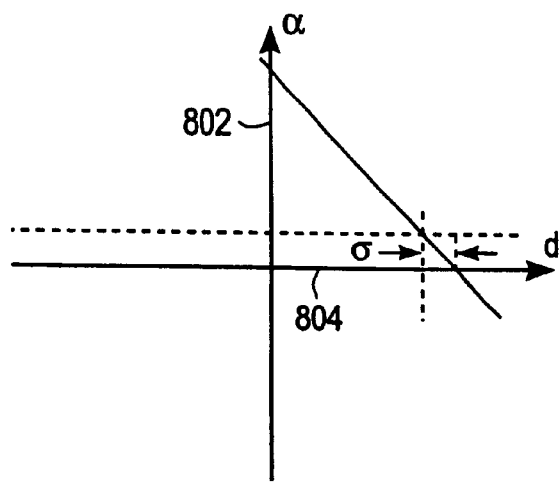
FIG. 8 shows the linear equation used for fading out a terrain layer over the sigma overlap region in accordance with an embodiment of the present invention.
Figure 9:
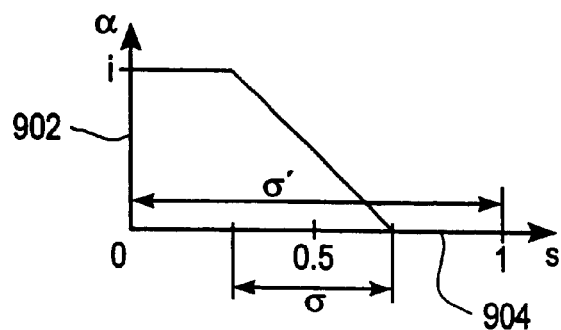
FIG. 9 shows a plot used to generate a fading table for use on layers with low vertex density in accordance with an embodiment of the present invention.

In order to achieve smooth fading between layers, each layer preferably features a Fade Band around its circumference corresponding to the overlap sigma. Over this distance, the Alpha (opacity) of the layer transitions from 1.0 (opaque) to 0.0 (fully transparent). FIG. 8 is a graph of a linear equation used to implement this transition in accordance with a preferred embodiment. The vertical axis 802 corresponds to Alpha, and the horizontal axis 804 corresponds to the world axis-aligned distance from the ownship 202. Consecutive layers are preferably blended using an equation such that the composite pixel value in the frame buffer is equal to Alpha*$C_{small}$+(1−Alpha*$C_{big}$), wherein $C_{small}$ is the color value from the smaller layer and $C_{big}$ is the color value from the larger layer. In a preferred embodiment, the equation corresponding to the graph in FIG. 8 is evaluated per-vertex, and the results are clamped to the range [0,1]. When using this per-vertex approach, it is desirable to have sufficient vertex density in each layer as to guarantee that at least 2 samples (vertices) of each row or column fall within the fading band. If an insufficient number of vertices fall within the fading band, the fading band will be deformed in an uncontrolled manner, with the width and position of the fading band depending on the relative positions of vertices straddling the ideal band. If the width is uncontrolled, fading artifacts such as holes and popping may result. If a vertex density sufficient for per-vertex fading is unattainable due to performance or other considerations, a one-dimensional fading texture containing a fading table may be used to tighten the fading band. The fading table may contain an equation such as that depicted in the graph of FIG. 9. In FIG. 9, the vertical axis 902 represents alpha, and the horizontal axis 904 represents vertex position within a stretched fade band. The fading equation implements a "stretch factor" equal to sigma' divided by sigma. For example, if the vertex density is half what is required to have enough vertices within the fading band, a fading table is created with a stretch factor of 2. For this fading equation, the texture coordinates are preferably generated using the linear equation in FIG. 8, with sigma corresponding to sigma' in FIG. 9.

The vertices are stored, per layer, in a scene database, which is preferably located on one of the devices of input/output devices 107. In a preferred embodiment, the vertices are grouped into tiles, each tile being the size of the rendering layer corresponding to the scene database layer: Tiling the layers maximizes the spatial coherency of database accesses. In a preferred embodiment, each tile also contains metadata such as tile minimum and maximum elevation, and tile type (e.g., sea, land, coast).

Figure 10:
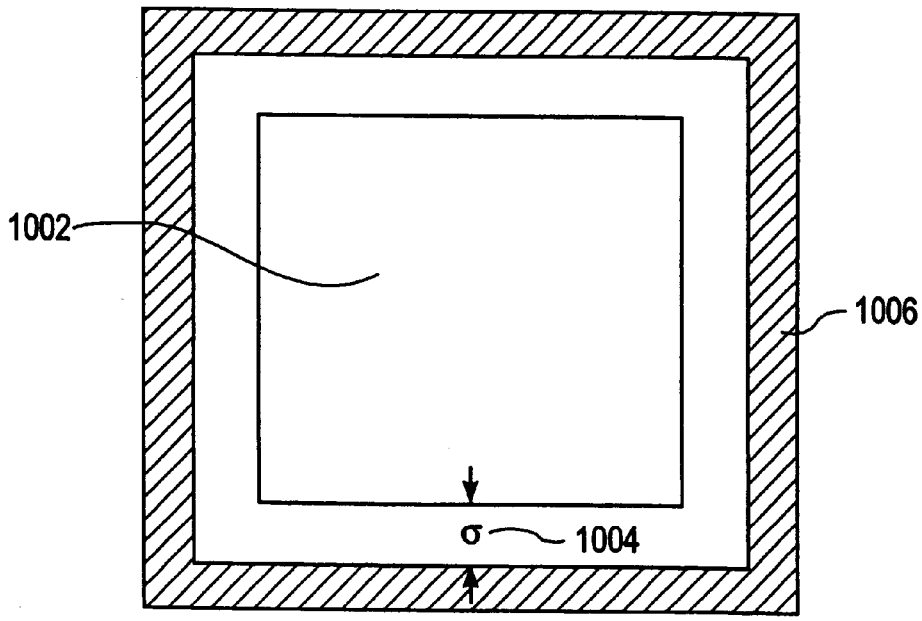
FIG. 10 illustrates the application of a texture map to a terrain rendering layer in accordance with an embodiment of the present invention.

FIG. 10 illustrates the application of a texture map onto a layer. The layer 1002, which may or may not be divided into sectors (depending on whether it is the smallest layer), contains fading region sigma 1004. The texture applied to the layer represents an area larger than the layer's extents, resulting in paging band 1006. A purpose of this band 1006 is to provide a region of texture memory for paging rows and columns of texels that is not rendered, and therefore will not cause incorrect texels or other texture paging artifacts to be seen.

Figure 11A:
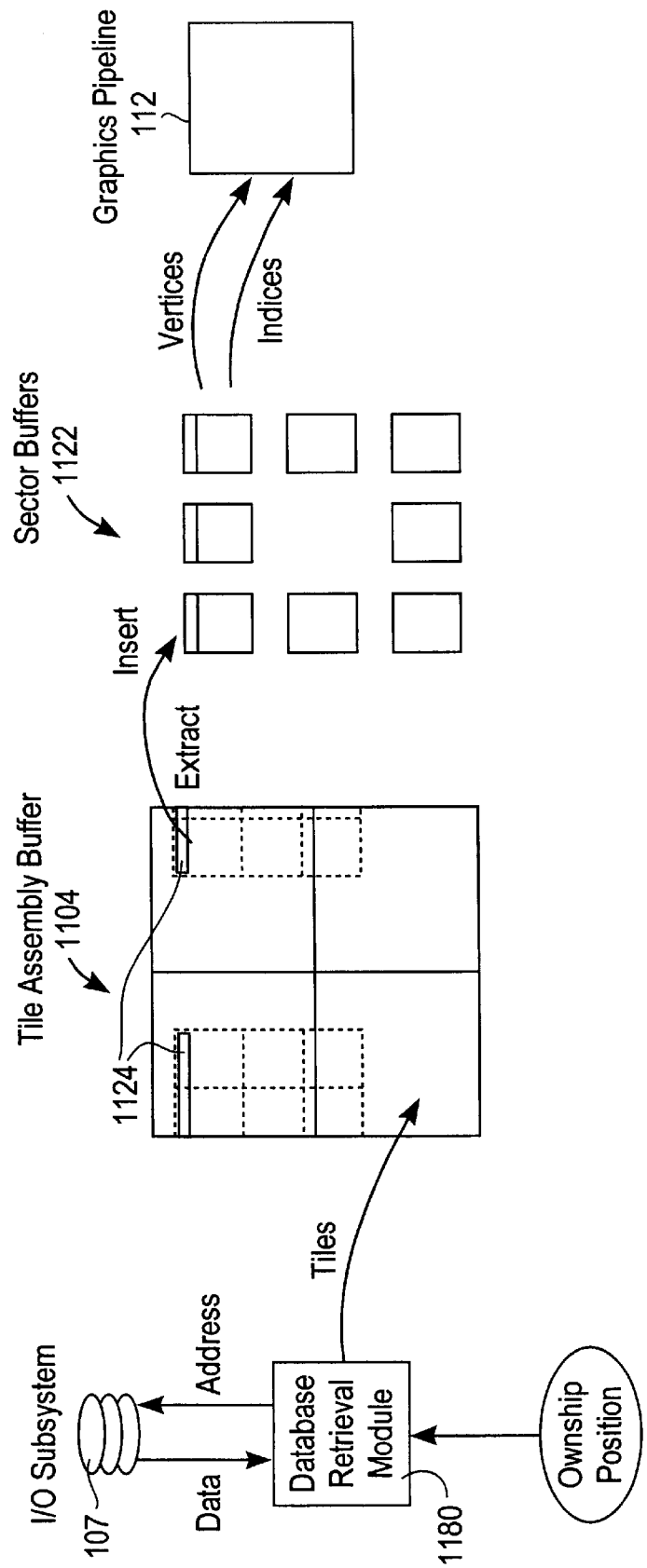
FIGS. 11a is an overview of the dataflow of terrain geometry from disk to the graphics subsystem in accordance with an embodiment of the present invention.

FIG. 11a illustrates a process by which geometry data is conveyed from a scene database stored on an input/output device 107 to the graphics pipeline 112 in a preferred embodiment. FIG. 11a illustrates the flow for a single layer. Database retrieval module 1180 reads vertices (tiles) from disk memory or other input/output device 107 (which may be local to the computer performing the rendering or on a file server) and inserts the data into a tile assembly buffer 1104, which in a preferred embodiment is a buffer allocated in memory. Tiles are fetched from the scene database as the viewer roams through the database extents. Because of this roaming behavior, the tile assembly buffer 1104 is preferably accessed using toroidal addressing.

Toroidal addressing, which is known to those skilled in the art, is a method for storing data using modulo arithmetic—which is topologically toroidal—to map a subset of a large dataset into a smaller amount of memory. For the purposes of the present invention, two-dimensional (2D) toroidal addressing is used. In 2D toroidal addressing, each datum (e.g., tiles 1220, 1222, etc.) can be uniquely identified by X and Y addresses. Each datum is placed in the tile assembly buffer 1104 using intra-buffer addresses X'(X mod Width) and Y'=(Y mod Height). If this smaller region of memory corresponds to the area of regard of a viewer roaming through a larger database, toroidal addressing is advantageous because it allows for data stored in the smaller buffer to be left in-place until the area of regard has moved sufficiently that that data is no longer needed. For example, if the viewer's area of regard moves east such that it exceeds the eastern border of the toroidal buffer, the western column of the buffer (which is no longer within the area of regard if the buffer is correctly sized to be a minimum of twice the dimensions of the area of regard) is replaced with a column of data east of the former eastern border of the buffer.

This modulo wrapping behavior allows the data that was covered by the area of regard both before and after roaming to remain in place, which is preferable to relocating all the data in the buffer whenever the area of regard roams outside its prior extents. If data is to be extracted from a toroidal buffer in a spatially continuous organization, the data must often be reorganized to "unwrap" the data in the buffer, in which, for example, a datum with an X' address of 5 could be east of a datum with an address of 6 due to the modulo addressing.

Figure 11B:
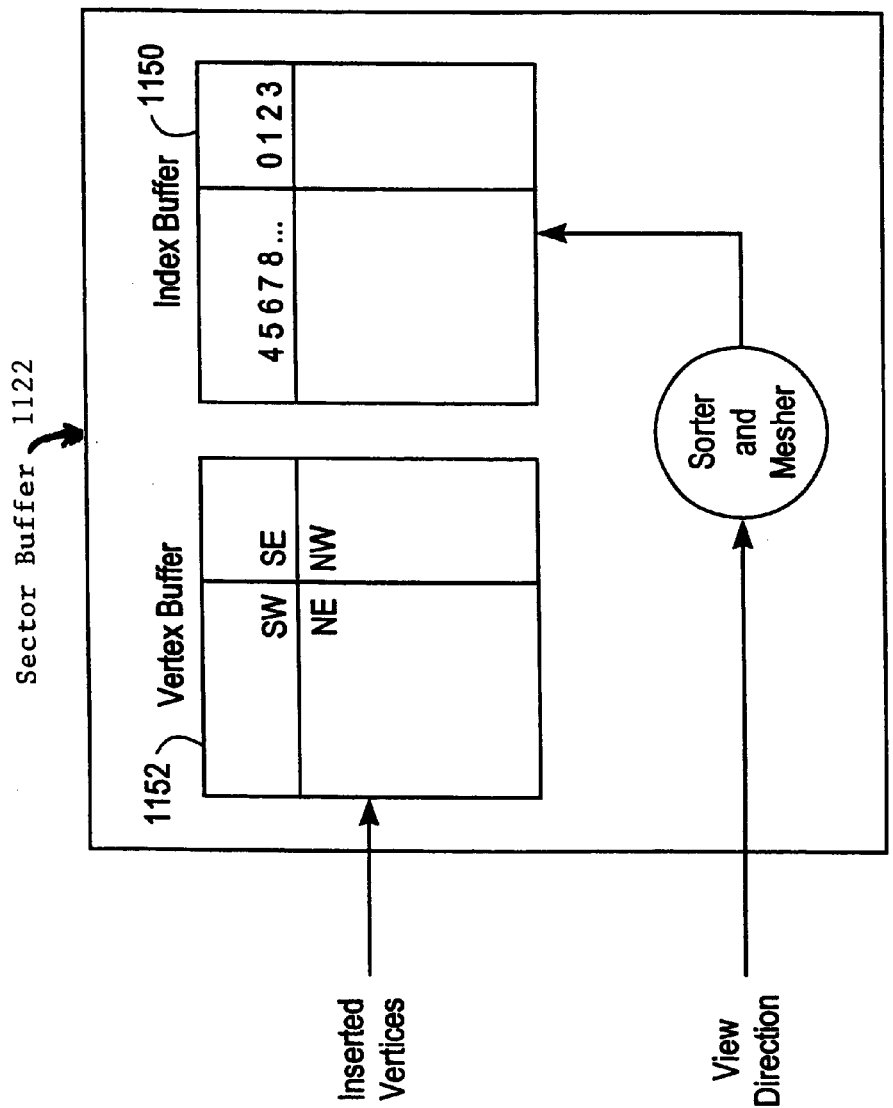
FIG. 11b is an illustration of a sector buffer in accordance with an embodiment of the present invention.

Referring again to FIG. 11a, vertices are extracted from the tile assembly buffer 1104 in the form of one or more rows or columns per access, and are inserted into sector vertex buffers 1106, which store all the vertices required to render each sector of the layer. For example, row 1124 is a toroidally stored row in the tile assembly buffer 1104. Row or column fetches are triggered when the ownship 202 moves one row width (axis-aligned) from its position when last the sector vertex buffers were updated. For example, if the vertices are in rows spaced approximately 50 meters apart, each time the ownship 202 moves 50 meters, a row or column is inserted into each of the sector vertex buffers. Because of the roaming behavior of the viewpoint, the sector vertex arrays are also addressed toroidally. In a preferred embodiment, the stored vertices are rendered as a mesh of polygons in a triangle strip structure, where (n+2) vertices describe a strip of n triangles. Triangle strips are used because they are the most efficient drawing primitive in most graphics systems, but the system is not restricted to their use. Other embodiments may use individual triangles or specialized mesh primitives. Referring now to FIG. 11b, there is shown a view of a sector buffer 1122. Mesh topology is imparted onto the geometry via sector index buffers 1150. The sector index buffers 1150 are constructed such as to "unwrap" the toroidal topology of the sector vertex buffers 1152 for rendering. The index arrays, which specify the order in which vertices from the vertex buffer are inserted into triangle strips, embody the mapping from the toroidally organized vertices to the spatially organized triangle strips as rendered by the graphics subsystem. The sector index buffers 1150 also specify the sorting of the sector geometry by the order in which the primitives are specified.

During drawing, the geometry encoded into buffers 1150 and 1152 is rendered by the graphics pipeline 112. In a preferred embodiment, the graphics pipeline 112 is capable of executing application-specified geometry processing microcode (e.g., "vertex programs" also known as "vertex shaders"). According to this embodiment, such custom microcode evaluates the linear fading equation depicted in FIG. 8 and may also perform texture coordinate generation, vertex offset calculations, and any other instructions necessary for special shading (e.g., layered fog, landing light lobes), as well as common vertex processing algorithms such as those contained in the OpenGL specification. In another embodiment, with hardware that does not support custom user microcode, all the calculations are performed on the system's CPU prior to the rendering process.

Figure 12:
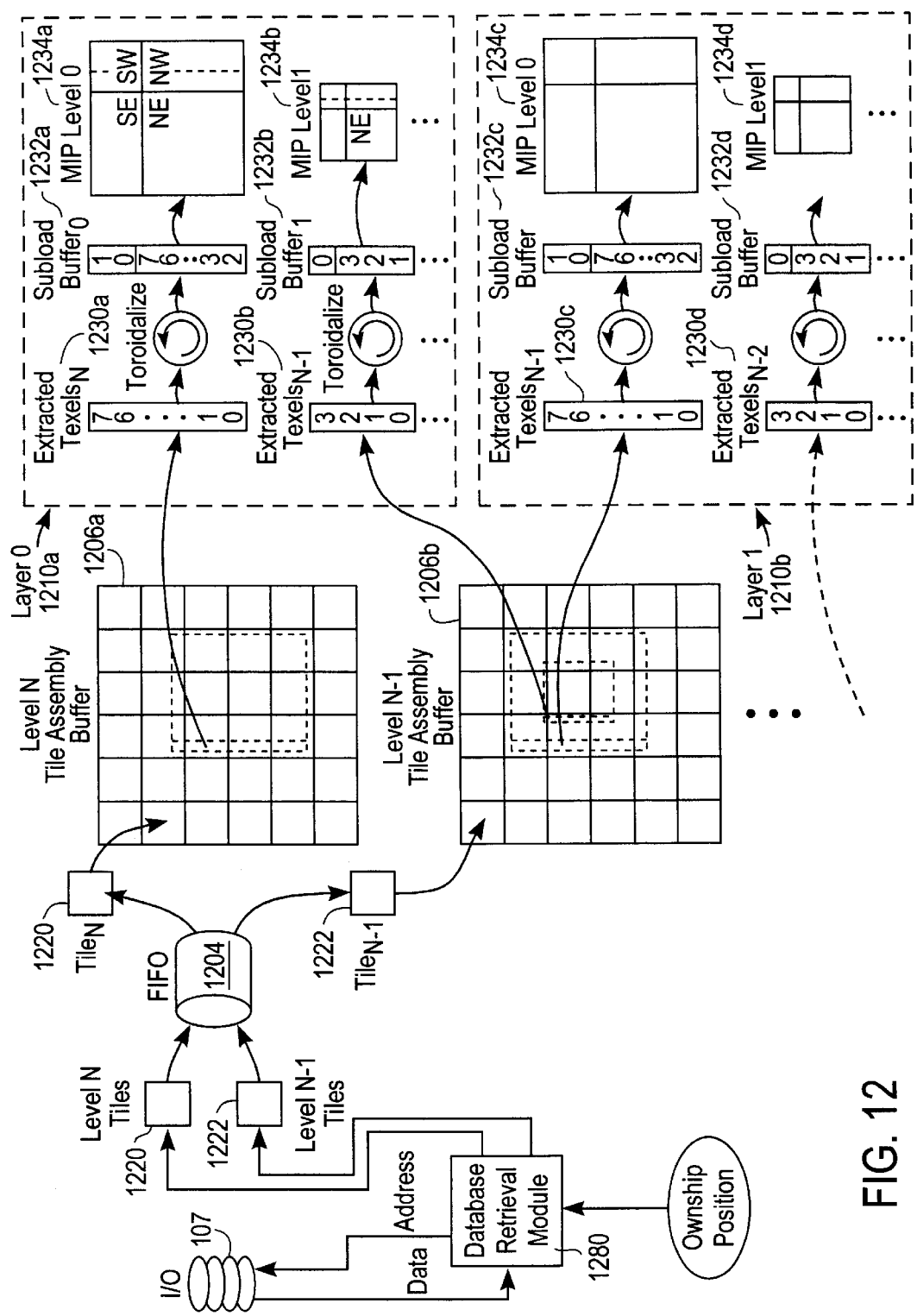
FIG. 12 is an overview of the dataflow of texels from disk to the graphics subsystem in accordance with an embodiment of the present invention.

FIG. 12 illustrates the process by which texture data is conveyed from the scene database to the graphics pipeline 112. In a preferred embodiment, the texture data includes a transparency mask channel that is used to provide a coast mask to overlay the terrain and the sea layers. In addition, the texture data can be stored and rendered in compressed form using hardware or software texture compression. The sparse image pyramid, which represents the terrain texture map, is preferably stored within the scene database of input/output device 107. In a preferred embodiment, each level of the pyramid is subdivided into tiles of equal size. For levels having an entire size less than the chosen tile size, the level may either be padded out to an entire tile or be stored without regard to the tile size, depending on the implementation details of the particular system. Tiles 1220, 1222 are fetched by database retrieval module 1280, for each level respectively, from the scene database according to the ownship 202 location and movement through the database extents, and are pushed into a first-in, first-out (FIFO) queue 1204. In a preferred embodiment, FIFO queue 1204 includes a multicast networking infrastructure between a dedicated texture paging computer system and various rendering computer systems ("channels"), which enables a single copy of the terrain texture to be stored local to one computer and shared by the many rendering channels that may comprise a single Image Generator.

For each level 0 through n of the image pyramid, tile assembly buffers 1206a–1206n are preferably used to assemble the texture tiles into a single image. The tile assembly buffers 1206 are preferably sized such that they are a multiple, e.g., three, of the maximum relevant layer texture size. For example, suppose the finest layer to which a given texture level is applied uses a texture map of size 1024×1024 texels for rendering. Buffer 1206 for the level in question would then be 3072×3072 texels in size. The "footprint" of this buffer (e.g., a square of 3072×3072 texels centered at the ownship 202 position, in texture coordinates) is used to determine which tiles are fetched from the database. Tile assembly buffers 1206 also include a valid bit for each tile within the buffer. These valid bits are used to determine which tiles are present in the buffer. Because of roaming, tile assembly buffers 1206 preferably are internally addressed toroidally, and when texels are extracted, they are reorganized spatially.

Layers 1210a and 1210b correspond to two rendering layers, wherein 1210b is twice the size (i.e., half the resolution) of layer 1210*a*. As the ownship 202 roams through the database extents, it is necessary to update subsets of the texture maps applied to each layer. Because each layer texture is a MIP-map, each layer must obtain texels from multiple texture levels, via tile assembly buffers 1206. After it has been determined which texels from a given level are to be updated, inquiries are made to buffer 1206 to ascertain if the requested texels are available. This is done by querying the valid bits for tiles overlapped by the needed texture area. If the required region is valid, the texels are extracted from buffer 1206 and stored in an extracted texel buffer 1230 according to both the layer using the texels and the level from which the texels were extracted. Because of roaming considerations, the texture maps applied to rendering layers via MIP levels 1234 are addressed toroidally. Before "subloading" texels into MIP levels 1234, the texels must be reorganized to be addressed toroidally, or "toroidalized," e.g., by a "toroidalizer." The texels are then placed into subload buffer 1232 and inserted into MIP levels 1234 for rendering.

A valid mechanism is also used to keep track of which portions of MIP levels 1234 are valid, meaning corresponding to the area of the terrain covered by the texels in question. If ever any texels outside paging band 1006 of a particular level of a rendering layer texture are considered to be invalid, then that entire level is considered invalid. The conventionally-known OpenGL MIP LOD clamping mechanism or an equivalent mechanism is used to exclude invalid levels from rendering by setting the minimum LOD coarser than the invalid levels.

In a preferred embodiment, the smallest layer (e.g., 206 in FIG. 2) may have multiple terrain texture maps applied to the same geometry, using hardware multitexture support or multipass techniques.

Figure 13:
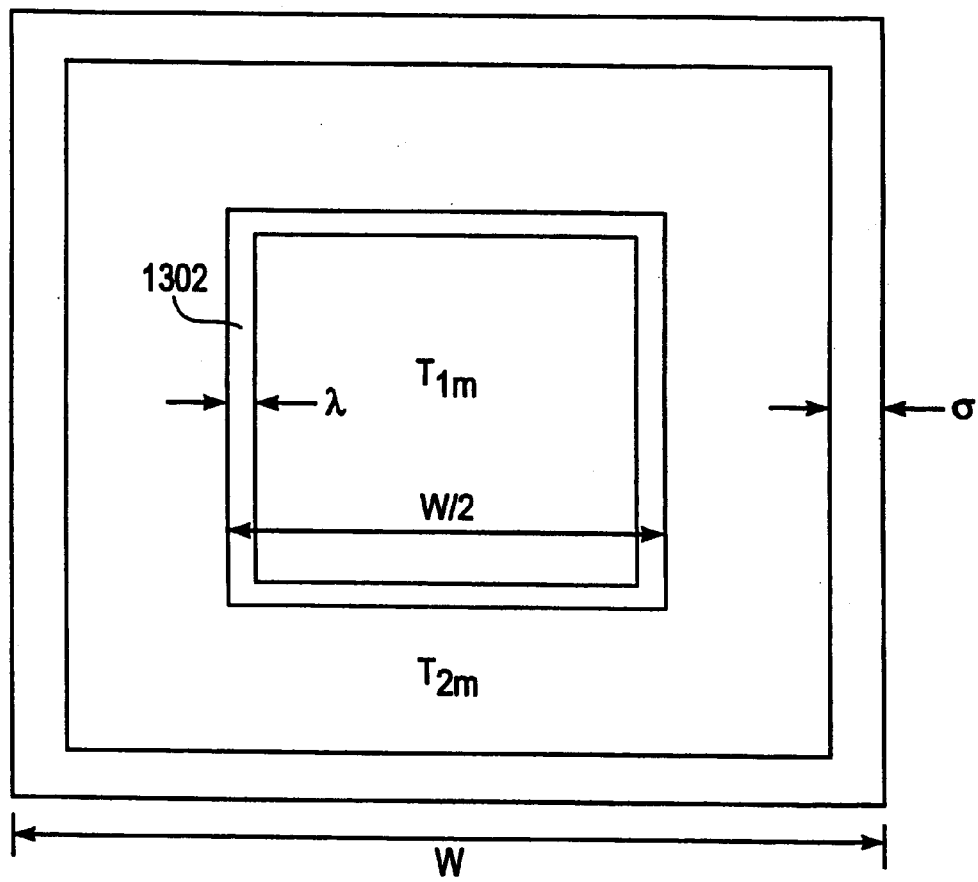
FIG. 13 illustrates the application of two texture maps to a single terrain rendering layer in accordance with an embodiment of the present invention.

This is desirable when, because of performance or other considerations, the smallest layer is too large to support the highest texture resolution in the scene database directly. For example, if the scene database contains 1 m imagery, and the smallest layer is approximately 4 km wide, it would be possible to apply 4 m imagery using a 1024×1024 texture, 2 m imagery using a 2048×2048 texture, or 1 m imagery using a 4096×4096 texture. Using a 4096×4096 texture is hardly feasible because it requires very large amounts of texture memory and texture paging bandwidth. 1 m resolution can be achieved by applying a 2048×2048 texture over the layer extents and an additional 2048×2048 texture to an area one-quarter the size of the layer, in the center of the layer, with a fading band between the two textures. This configuration, as shown in FIG. 13, is analogous to the configuration of two separate terrain layers, except that the two textures are applied to the same geometry. The inter-texture fading band lambda 1302 is determined in a manner similar to the inter-layer fading band sigma (1004, FIG. 10), using either the per-vertex or the stretch texture techniques described above. If using multipass techniques (i.e., drawing the smallest layer twice), it is possible to cut out the center region to prevent overdrawing. If using multitexture techniques, the two textures will overlap. As with the individual textures applied to each layer, each texture applied to the layer depicted in FIG. 13 is itself a MIP-map.

For simulating sensors, e.g., night vision goggles (NVG), forward-looking infrared (FLIR), low light level television (LLLTV), etc., texels stored in the database must represent spectral information beyond simple RGB colors in order to be accurately rendered. In a preferred embodiment, this information includes materials, e.g., granite, concrete, dirt, roses, geraniums, etc., which exhibit certain physical properties (such as multi-spectral reflectance) which define the way each texel responds to light of different wavelengths. This information, coupled with the spectral response of the specific sensor and the current environmental conditions, i.e., moon position and phase, ground-level air temperature and velocity, etc., defines how the terrain is viewed through a specific sensor. In a preferred embodiment, the calculations that embody the mapping from spectral texels to texels as perceived by the sensor are performed in the database retrieval module 1280, and the perceived intensity texels are then passed through the FIFO 1204, TAB 1206, etc., to the MIP-maps 1234 in the same manner as visible texels for rendering. Accordingly, if any of the sensor responses or environmental parameters change during run-time, all the texels for the area of regard are preferably reprocessed to reflect these changes.

Rendering of 3D sea is accomplished in a manner similar to rendering of land. Because the sea is dynamic (due to moving waves) and has unique Frensel reflectance properties that model the physical response of the water—as a dialectric medium—to light, it cannot simply be represented as a continuation of the static terrain geometry with a static texture applied. Instead, the sea geometry, texture or both must be part of a dynamic simulation. In a preferred embodiment, both the sea geometry and texture are generated using Fourier transforms, which have the intrinsic property of making the geometry and texture maps continuous (c0, c1, c2) at the borders of the simulation. As is known by those of skill in the art, c0, c1 and c2 are three different levels of geometric countinuity: c0 refers to positional continuity, c1 refers to the first derivative (slope) and c2 refers to the second derivative of the surface (curvature). This property of continuity allows a relatively small portion of sea to be simulated and then filed as many times as necessary to produce a large-area sea with no discontinuities at the edges of the tiles. In a preferred embodiment, levels of detail are generated by filtering the simulated sea geometry into progressively sparser meshes. This filtering process occurs for each timestep of the simulation.

Figure 14:
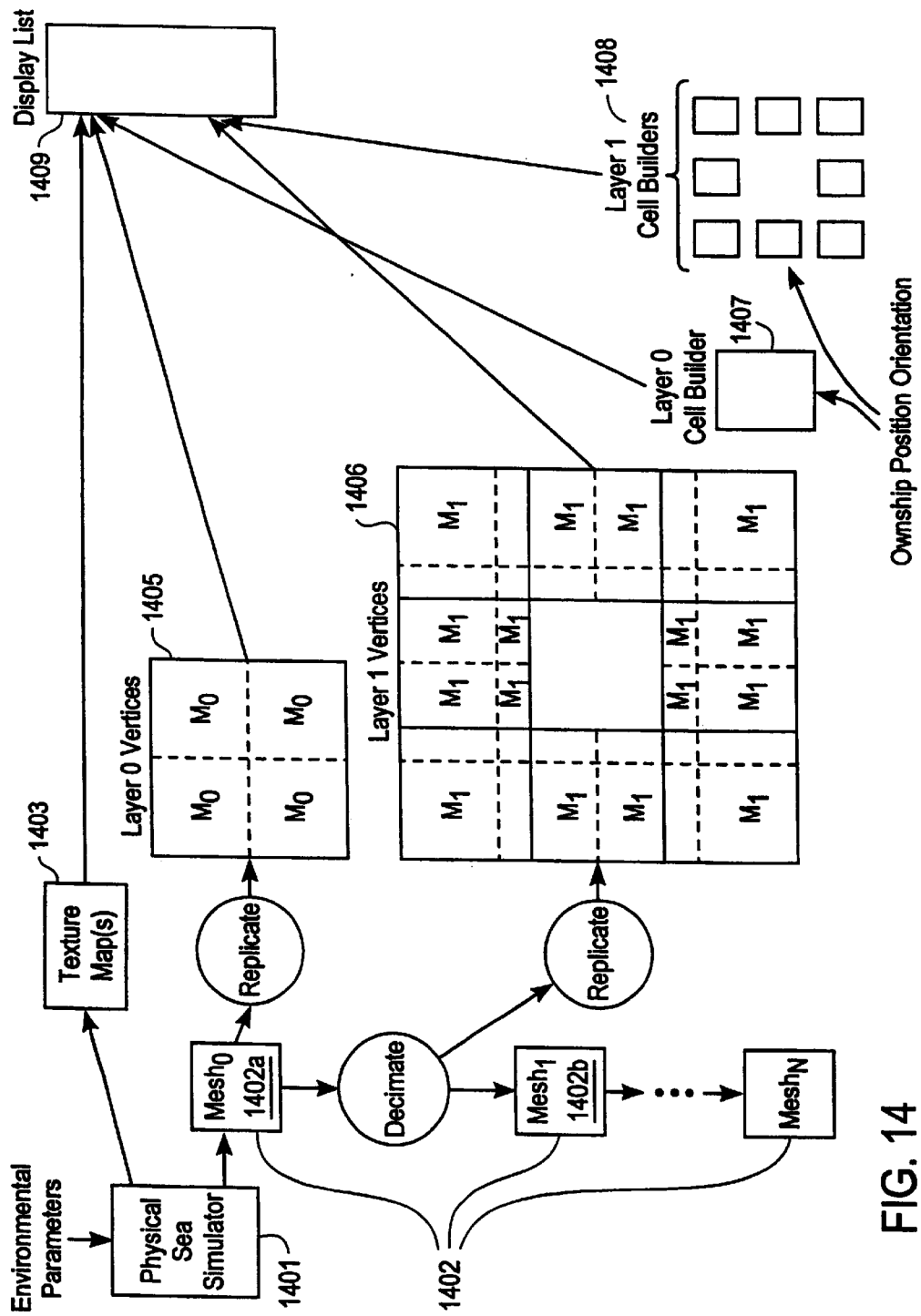
FIG. 14 is an overview of the dataflow of sea data from the physical simulator to the graphics subsystem in accordance with an embodiment of the present invention.

System 100 renders 3D sea by constructing a set of layers in a manner similar to the construction of terrain layers. There need not be the exact same number of layers as are used in the concurrently rendered land, but the largest layers of both the sea and land should preferably cover the same area to preserve a constant horizon, regardless of whether sea or land. As with the terrain layers described above, the smallest sea layer should have the highest vertex density, and the largest should have the lowest vertex density. Because the layers cover progressively larger areas, larger layers will render larger numbers of repetitions of the sea simulation and its respective filtered LODs. Referring to FIG. 14, Physical Sea Simulator 1401 creates new meshes 1402 and texture maps 1403 as time progresses according to environmental parameters such as surface wind speed and direction. Base mesh 1402*a* (mesh0) is decimated to produce mesh1 1402*b*, which covers the same physical area but with fewer vertices. Mesh1 1402*b* may then be further decimated to produce mesh2 and so forth, for as many LODs are required. The meshes are then replicated into layer vertex buffers according to the number of copies of the mesh are required to cover the area of corresponding layer. This is shown in vertex buffers 1405 and 1406. Note that the arrangement of the mesh tiling is such that if the two layers shown were overlayed, the meshes M0 would line up with the meshes M1. This is important to prevent discontinuities at layer boundaries. The vertex buffers 1405 and 1406 are combined with index buffers generated by cell builders 1407 and 1408 and supplied along with texture maps 1403 to the graphics pipeline 112 via display list 1409. In another embodiment, the geometry and texture data is conveyed to the graphics subsystem in "immediate mode" without the use of display lists.

Figure 15:
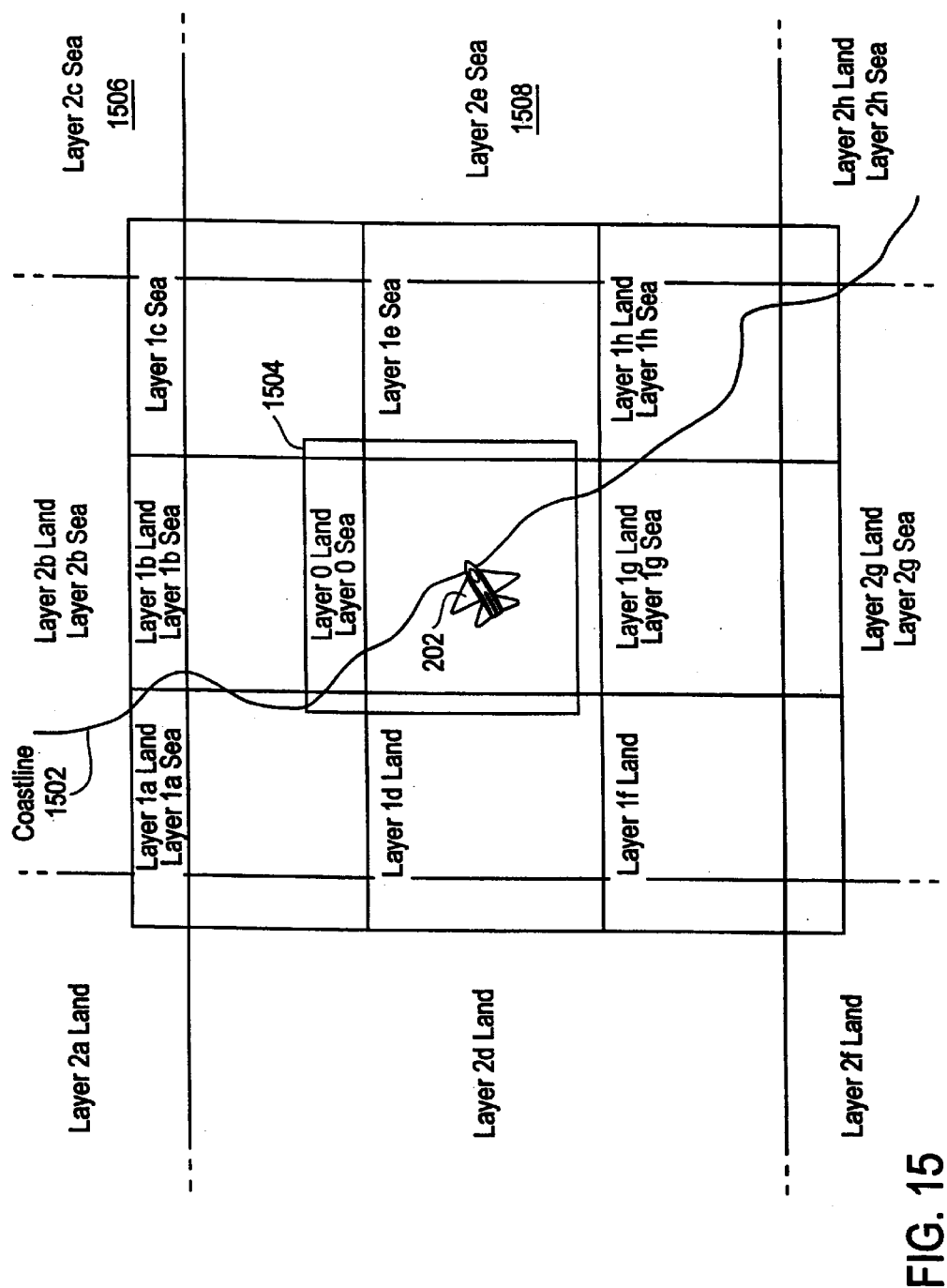
FIG. 15 illustrates the simultaneous use of land and sea layers in accordance with the present invention.

FIG. 15 illustrates a rendering of coastline 1502 with simultaneous use of terrain (land) and sea layer stacks to render a composite scene. Each layer stack operates independently, with both driven by the ownship 202 position. For example, in FIG. 15, ownship 202 is illustrated just crossing over coastline 1502. Thus, layer 0 1504 is rendered twice, using two layer stacks simultaneously. The transparency component of the terrain texture is used to mask out the terrain over the sea area, resulting in very fine definition of coastline. In a preferred embodiment, performance is enhanced through the use of terrain-type data contained in the scene database. This type data specifies which areas of the database extents are covered by land and sea, and may be embedded in the terrain layers or stored in a separate file. During rendering, the type data is queried and used to make layers or sectors of layers visible or invisible, depending on whether they cover sea, land, or both. By turning off layers or sectors that are mismatched (e.g., sea under Las Vegas), scene complexity is reduced and performance is increased. Referring still to FIG. 15, note that some sectors of the terrain rendering layers, e.g., layers 2c 1506 and 2e 1508, are preferably not drawn because they fall entirely in the sea.

The present invention has been described in particular detail with respect to specific embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the graphics pipeline, the geometry processor, and so forth may be provided in more or fewer modules.

Some portions of above description present the feature of the present invention in terms of algorithms and symbolic representations of operations on information. These algorithmic descriptions and representations are the means used by those skilled in the graphics rendering arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for rendering terrain, the terrain having at least one level of detail, the method comprising:
   retrieving a plurality of vertices from a scene database, each vertex associated with at least one level of detail of the terrain;
   organizing the retrieved vertices into a plurality of layers, each layer centered about a viewer;
   applying a texture to each of the plurality of layers; and
   rendering the layers.

2. The method of claim 1, wherein the terrain is land.

3. The method of claim 1, wherein the terrain is sea.

4. The method of claim 1, wherein at least one of the layers is subdivided into sectors.

5. The method of claim 4, wherein at least one of the subdivided layers has a center sector overlapped by another of the layers, and the center sector is not rendered.

6. The method of claim 1, wherein at least one of the layers includes at least one fade band, for fading between layers.

7. A system for rendering terrain from a viewpoint, the viewpoint having an area of regard, the system comprising:
   a database, for storing vertices and texture maps, the vertices representing points on a surface of an object to be rendered, the texture maps representing visual properties of the surface of an object to be rendered;
   a first database retrieval module, for retrieving vertices from the database and storing the retrieved vertices in a tile assembly buffer;
   a first tile assembly buffer, communicatively coupled to the first database retrieval module, for storing a plurality of vertices included within the area of regard;
   at least one sector buffer, for storing vertices extracted from the first tile assembly buffer, and for assembling the extracted vertices into geometric primitives for rendering; and
   a graphics pipeline for rendering the geometric primitives.

8. The system of claim 7, wherein the first tile assembly buffer is addressed toroidally.

9. The system of claim 7, wherein vertices stored in the sector buffers are addressed toroidally.

10. The system of claim 7, further comprising:
    a second database retrieval module for retrieving a plurality of texels from the database;
    a second tile assembly buffer for storing the retrieved texels included within the area of regard;
    a toroidalizer, which extracts texels from the second tile assembly buffer and inserts the extracted texels in a subload buffer; and
    a subload buffer, which retrieves texels from the toroidalizer, and stores texels to be included in a texture map.

11. The system of claim 10, wherein the second database retrieval module is further configured to retrieve spectral texels from the scene database, and to map the spectral texels to intensity texels, the intensity texels representing a perceived appearance of the spectral texels by a sensor.

12. The system of claim 11, wherein the spectral texels include material references indicative of physical properties of the surface to be textured.

13. A computer program product, comprising computer program instructions, stored on a computer-readable medium, the instructions executable by a computer, to perform the operations of:
    retrieving a plurality of vertices from a scene database, each vertex associated with at least one level of detail of the terrain;
    organizing the retrieved vertices into a plurality of layers, each layer centered about a viewer;
    applying a texture to each of the plurality of layers; and
    rendering the layers.

* * * * *